US010290851B2

(12) United States Patent
Yuasa et al.

(10) Patent No.: US 10,290,851 B2
(45) Date of Patent: May 14, 2019

(54) ENERGY STORAGE APPARATUS

(71) Applicants: GS Yuasa International Ltd., Kyoto-shi (JP); Honda Motor Co., Ltd., Tokyo (JP)

(72) Inventors: Eiji Yuasa, Kyoto (JP); Kentaro Shibuya, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/436,353

(22) Filed: Feb. 17, 2017

(65) Prior Publication Data

US 2017/0244091 A1   Aug. 24, 2017

(30) Foreign Application Priority Data

Feb. 19, 2016   (JP) ................. 2016-030226

(51) Int. Cl.
*H01M 2/30* (2006.01)
*H01M 2/20* (2006.01)
(Continued)

(52) U.S. Cl.
CPC .............. *H01M 2/30* (2013.01); *H01G 11/10* (2013.01); *H01G 11/76* (2013.01); *H01G 11/82* (2013.01);
(Continued)

(58) Field of Classification Search
CPC ....... H01M 2/1016; H01M 2/202; H01M 2/30
(Continued)

(56) References Cited

U.S. PATENT DOCUMENTS

2013/0330587 A1   12/2013  Takahashi et al.
2015/0132634 A1    5/2015  Sera et al.
(Continued)

FOREIGN PATENT DOCUMENTS

JP    2012-113897 A    6/2012
JP    2014-044884 A    3/2014
(Continued)

*Primary Examiner* — James M Erwin
(74) *Attorney, Agent, or Firm* — McGinn I. P. Law Group, PLLC.

(57) ABSTRACT

Provided is an energy storage apparatus which includes: a plurality of energy storage devices which respectively have an external terminal and are arranged in a row in a first direction; an adjacent member disposed between the energy storage devices disposed adjacently to each other in the first direction; and a bus bar which connects the external terminals of the energy storage devices disposed on both sides of the adjacent member to each other. The bus bar includes: a first connecting portion connected to one external terminal; a second connecting portion connected to the other external terminal; and a portion which extends in a projecting manner in a direction away from the adjacent member in a second direction orthogonal to the first direction or a portion which extends in a recessed manner in a direction that the portion approaches the adjacent member in the second direction in a state where the portion is spaced-apart from the adjacent member between the first connecting portion and the second connecting portion.

13 Claims, 14 Drawing Sheets

(51) Int. Cl.
  *H01G 11/10* (2013.01)
  *H01M 2/10* (2006.01)
  *H01G 11/76* (2013.01)
  *H01G 11/82* (2013.01)

(52) U.S. Cl.
  CPC ......... *H01M 2/1016* (2013.01); *H01M 2/202* (2013.01); *Y02E 60/13* (2013.01)

(58) Field of Classification Search
  USPC ........................................................ 429/121
  See application file for complete search history.

(56) References Cited

U.S. PATENT DOCUMENTS

| | | | |
|---|---|---|---|
| 2016/0036028 A1* | 2/2016 | Tsuruta | H01M 2/204 429/121 |
| 2016/0126514 A1 | 5/2016 | Suzuki et al. | |

FOREIGN PATENT DOCUMENTS

| | | |
|---|---|---|
| JP | 2015-099649 A | 5/2015 |
| JP | 2016-054063 A | 4/2016 |
| WO | WO 2012-066875 A1 | 5/2012 |
| WO | WO 2013/179796 A1 | 12/2013 |
| WO | WO 2014/203342 A1 | 12/2014 |

\* cited by examiner

ENERGY STORAGE APPARATUS

CROSS-REFERENCE TO RELATED APPLICATIONS

This application claims the benefit of Japanese patent application No. 2016-030226 filed on Feb. 19, 2016 which is incorporated by reference.

FIELD

The present invention relates to an energy storage apparatus which includes energy storage devices having external terminals, and bus bars connected to the external terminals.

BACKGROUND

Conventionally, there has been known a battery system which includes a plurality of flat secondary batteries (see JP 2014-44884 A). To be more specific, the battery system includes: the plurality of flat secondary batteries respectively having electrode terminals and are stacked in a thickness direction; bus bars each connecting the electrode terminals of the flat secondary batteries disposed adjacently to each other; and intermediate reinforcing plates each disposed between the flat secondary batteries.

The bus bar is a conductive member having a flat plate shape which extends straightly in a stacking direction of the flat secondary batteries. Both ends of the bus bar are respectively fixed to the above-mentioned electrode terminals to be connected. The electrode terminals of the flat secondary batteries disposed on both sides of the intermediate reinforcing plate are also connected to each other by the bus bar. The battery system further includes bind bars and end plates which apply a pressure to the flat secondary batteries in the stacking direction. The intermediate reinforcing plate is fixed to the bind bars by screws.

In the battery system, when acceleration in the stacking direction of the flat secondary batteries is generated, since the intermediate reinforcing plate is fixed to the bind bars, there may be a case where a difference is generated between a moving amount of the flat secondary battery on one side of the intermediate reinforcing plate and a moving amount of the flat secondary battery on the other side of the intermediate reinforcing plate in the stacking direction so that a distance between the flat secondary battery changes.

In this case, in the bus bar which connects the electrode terminal of the flat secondary battery on one side and the electrode terminal of the flat secondary battery on the other side to each other, a stress caused by a change in the above-mentioned distance is concentrated on a connecting portion between the electrode terminals and hence, the connecting portion is liable to be damaged.

Such a phenomenon may also occur in a case where a total terminal of the battery system which is used for inputting and outputting of electricity to and from the outside is fixed to the end plate. That is, when a difference is generated in moving amount between the total terminal fixed to the end plate and the electrode terminal of the flat secondary battery so that the distance changes, in the bus bar which connects the total terminal and the electrode terminal to each other, a stress caused by such a change is concentrated on the electrode terminal or connecting portions with the total terminal and hence, such portions are easily damaged.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus where a bus bar connected to an external terminal of an energy storage device is hardly damaged.

According to an aspect of the present invention, there is provided an energy storage apparatus which includes:

a plurality of energy storage devices which respectively have an external terminal and are arranged in a row in a first direction;

an adjacent member disposed between the energy storage devices disposed adjacently to each other in the first direction;

a holder provided for holding the plurality of energy storage devices and the adjacent member by surrounding a periphery of the plurality of energy storage devices and the adjacent member, wherein the adjacent member is fixed to the holder; and a bus bar which is configured to make the external terminals of the energy storage devices disposed on both sides of the adjacent member among the plurality of energy storage devices conductive with each other wherein the bus bar includes:

a first connecting portion connected to one external terminal which is made conductive by the bus bar;

a second connecting portion connected to the other external terminal which is made conductive by the bus bar; and at least one portion out of a portion which extends in a projecting manner in a direction away from the adjacent member in a second direction orthogonal to the first direction and a portion which extends in a recessed manner in a direction that the portion approaches the adjacent member in the second direction in a state where the portion is spaced-apart from the adjacent member between the first connecting portion and the second connecting portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
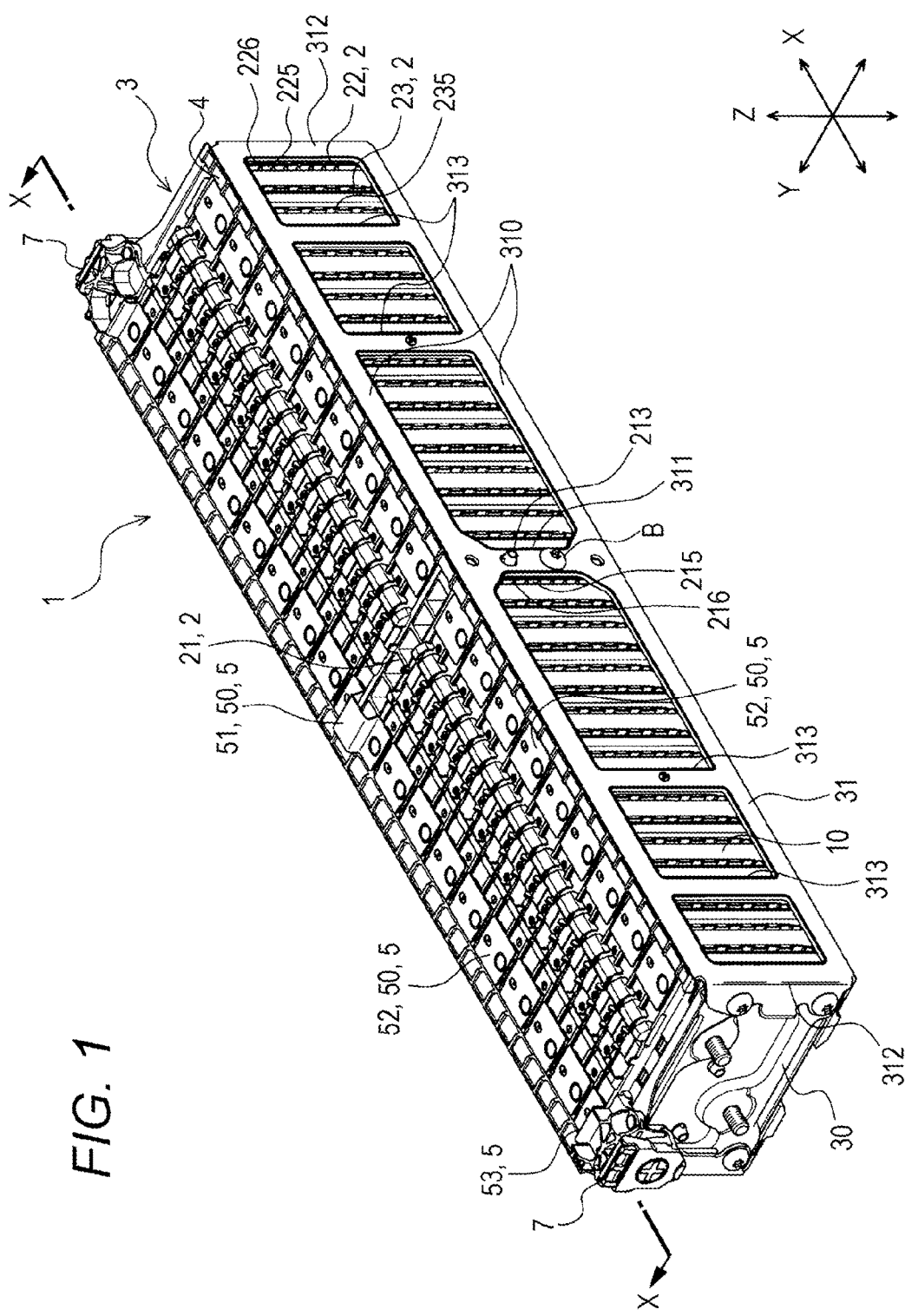
FIG. 1 is a perspective view of an energy storage apparatus according to an embodiment of the present invention.

According to an aspect of the present invention, there is provided an energy storage apparatus which including:

a plurality of energy storage devices which respectively have an external terminal and are arranged in a row in a first direction;

an adjacent member disposed between the energy storage devices disposed adjacently to each other in the first direction;

a holder provided for holding the plurality of energy storage devices and the adjacent member by surrounding a periphery of the plurality of energy storage devices and the adjacent member, wherein the adjacent member is fixed to the holder; and a bus bar which is configured to make the external terminals of the energy storage devices disposed on both sides of the adjacent member among the plurality of energy storage devices conductive with each other wherein the bus bar includes:

a first connecting portion connected to one external terminal which is made conductive by the bus bar;

a second connecting portion connected to the other external terminal which is made conductive by the bus bar; and at least one portion out of a portion which extends in a projecting manner in a direction away from the adjacent member in a second direction orthogonal to the first direction and a portion which extends in a recessed manner in a direction that the portion approaches the adjacent member in the second direction in a state where the portion is spaced-apart from the adjacent member between the first connecting portion and the second connecting portion.

With such a configuration, even when a distance between the energy storage devices disposed on both sides of the adjacent member changes due to a difference in a moving distance between the holder (adjacent member), the energy storage device on one side of the adjacent member and the energy storage device on the other side of the adjacent member when acceleration or the like is applied to the energy storage apparatus in one direction, at least one portion out of the portion of the bus bar which connects the external terminals of the energy storage devices to each other which extends in a projecting manner and the portion of such a bus bar which extends in a recessed manner expands or contracts and hence, it is possible to suppress the concentration of a stress caused by the change in the distance on the portion of the bus bar connected to the external terminal. Accordingly, it is possible to prevent the occurrence of damage on the bus bar caused by a change in the distance. That is, the bus bar which connects the external terminals of the energy storage devices disposed on both sides of the adjacent member is hardly damaged.

In the energy storage apparatus, the portion which extends in a projecting manner or the portion which extends in a recessed manner may include: a first raised portion extending in the second direction from the first connecting portion; and a second raised portion extending in the second direction from the second connecting portion; and a bridging portion which extends in the first direction and connects the first raised portion and the second raised portion to each other, wherein the bridging portion opposedly faces the adjacent member in a state where a distance is provided in the second direction between the bridging portion and the adjacent member.

With such a simple configuration, it is possible to suppress the concentration of a stress caused by a change in a distance between the energy storage devices disposed on both sides of the adjacent member on the portion of the bus bar connected to the external terminal when the distance changes.

In the energy storage apparatus, the bus bar may include a bent portion at least one of between the first raised portion and the bridging portion and between the second raised portion and the bridging portion.

With such a configuration, when a distance between the energy storage devices disposed on both sides of the adjacent member changes, in addition to the portion which extends in a projecting manner (or the portion which extends in a recessed manner), the bent portion extends or is further bent and hence, it is possible to more effectively suppress the concentration of a stress caused by a change in the distance on the portion of the bus bar connected to the external terminal.

In the energy storage apparatus, the bus bar may include a portion which extends in a projecting manner between the first connecting portion and the second connecting portion, and the adjacent member may include a projecting portion which projects toward the bridging portion and is positioned between the first raised portion and the second raised portion.

With such a configuration, when a distance between the energy storage devices disposed adjacently to each other with the adjacent member interposed therebetween intends to change by a predetermined amount or more, the first raised portion and the second raised portion are brought into contact with the projecting portion or the bridging portion is brought into contact with the projecting portion or the like and hence, such a change in distance can be suppressed.

According to another aspect of the present invention, there is provided an energy storage apparatus which includes:

a plurality of energy storage devices which respectively have an external terminal and are arranged in a row in a first direction;

an adjacent member disposed between the energy storage devices disposed adjacently to the adjacent member in the first direction, the adjacent member capable of being fixed to a support body which supports the plurality of energy storage devices and the adjacent member; and a bus bar which is configured to make the external terminals of the energy storage devices disposed on both sides of the adjacent member among the plurality of energy storage devices conductive with each other, wherein the bus bar includes:

a first connecting portion connected to one external terminal which is made conductive by the bus bar;

a second connecting portion connected to the other external terminal which is made conductive by the bus bar; and at least one portion out of a portion which extends in a projecting manner in a direction away from the adjacent member in a second direction orthogonal to the first direction and a portion which extends in a recessed manner in a direction that the portion approaches the adjacent member in the second direction in a state where the portion is spaced-apart from the adjacent member between the first connecting portion and the second connecting portion.

With such a configuration, even when a distance between the energy storage devices disposed on both sides of the adjacent member changes due to a difference in a moving distance between the adjacent member, the energy storage device on one side of the adjacent member and the energy storage device on the other side of the adjacent member when acceleration or the like is applied to the support body in one direction in a state where the adjacent member is fixed to the support body, at least one portion out of the portion of the bus bar which connects the external terminals of the energy storage devices to each other which extends in a projecting manner and the portion of such a bus bar which extends in a recessed manner expands or contracts and hence, it is possible to suppress the concentration of a stress caused by the change in the distance on the portion of the bus bar connected to the external terminal. Accordingly, it is possible to prevent the occurrence of damage on the bus bar caused by a change in the distance. That is, the bus bar which connects the external terminals of the energy storage devices disposed on both sides of the adjacent member is hardly damaged.

According to still another aspect of the present invention, there is provided an energy storage apparatus which includes:

an energy storage device having an external terminal;

a holder surrounding a periphery of the energy storage device and holding the energy storage device;

a total terminal used for inputting and outputting electricity to and from the outside and being fixed to the holder; and a bus bar electrically connecting the external terminal and the total terminal to each other, wherein the bus bar includes:

a first connecting portion connected to the external terminal;

a second connecting portion connected to the total terminal; and at least a portion out of a portion disposed between the first connecting portion and the second connecting portion and extending in a projecting manner in a direction away from the external terminal and the total terminal in a direction orthogonal to a direction where the external terminal and the all terminal are disposed parallel to each other and a portion disposed between the first connecting portion and the second connecting portion and extending in a recessed manner in a direction that the portion approaches the external terminal and the total terminal in the orthogonal direction.

With such a configuration, even when a distance between the total terminal and the external terminal changes due to a change in moving distance between the holder and the energy storage device when acceleration or the like in the direction where the total terminal and the external terminal which are connected by the bus bar to each other is applied to the energy storage apparatus, at least one portion out of the portion of the bus bar extending in a projecting manner which is connected to the total terminal and the external terminal and a portion of the bus bar connected to the total terminal and the external terminal and extending in a recessed manner is widened or narrowed and hence, it is possible to suppress the concentration of a stress caused by a change in the distance on the portion of the bus bar connected to the total terminal and the portion of the bus bar connected to the external terminal. With such a configuration, it is possible to prevent the occurrence of damage due to a change in the distance at the bus bar. That is, the bus bar which connects the external terminal of the energy storage device and the total terminal fixed to the holder to each other can be hardly damaged.

According to the present invention, it is possible to provide an energy storage apparatus where a bus bar connected to an external terminal is hardly damaged.

Hereinafter, one embodiment of the present invention is described with reference to FIG. 1 to FIG. 10. Names of respective constitutional members (respective constitutional elements) of this embodiment are used only for this embodiment, and may differ from names of respective constitutional members (respective constitutional elements) used in BACKGROUND.

Figure 2:
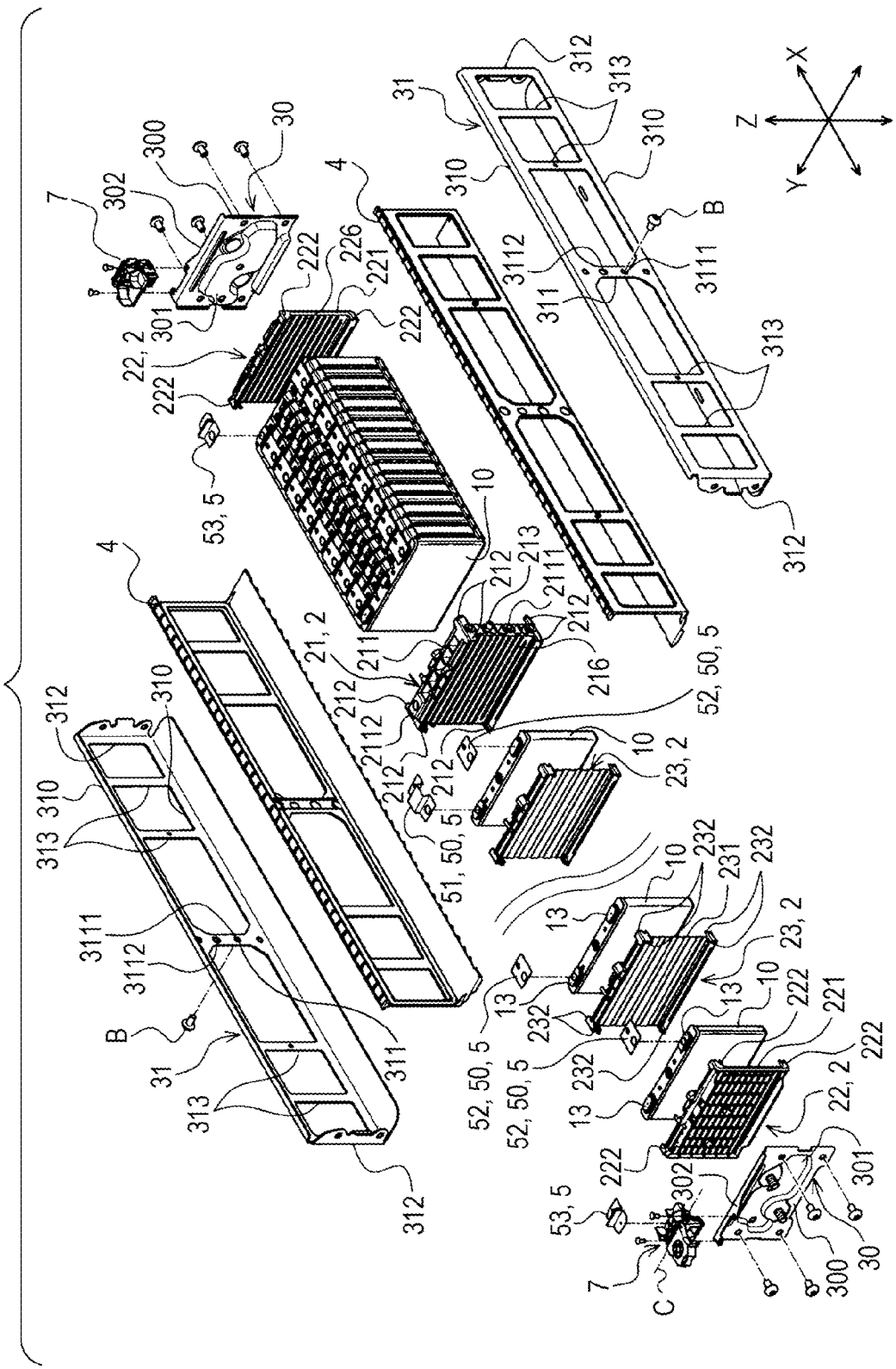
FIG. 2 is an exploded perspective view of a configuration of the energy storage apparatus in a state where the description of a part of the configuration is omitted.

As shown in FIG. 1 and FIG. 2, an energy storage apparatus includes: a plurality of energy storage devices 10 which are arranged in a row in a predetermined direction and each of which has external terminals 13; and a plurality of bus bars 5 each of which makes the external terminals 13 of the adjacent energy storage devices 10 conductive with each other. The energy storage apparatus 1 also includes: a plurality of adjacent members 2 each of which is disposed adjacently to the energy storage device 10; a holder 3 which collectively holds the plurality of energy storage devices 10 and the plurality of adjacent members 2; and insulators 4 which are disposed between the plurality of energy storage devices 10 and the holder 3. The energy storage apparatus 1 further includes a pair of terminal bases 7 having a total terminal 71 for inputting electricity from the outside of the energy storage apparatus 1 and a total terminal 71 for inputting electricity to the outside of the energy storage apparatus 1 respectively (see FIG. 8).

Figure 3:
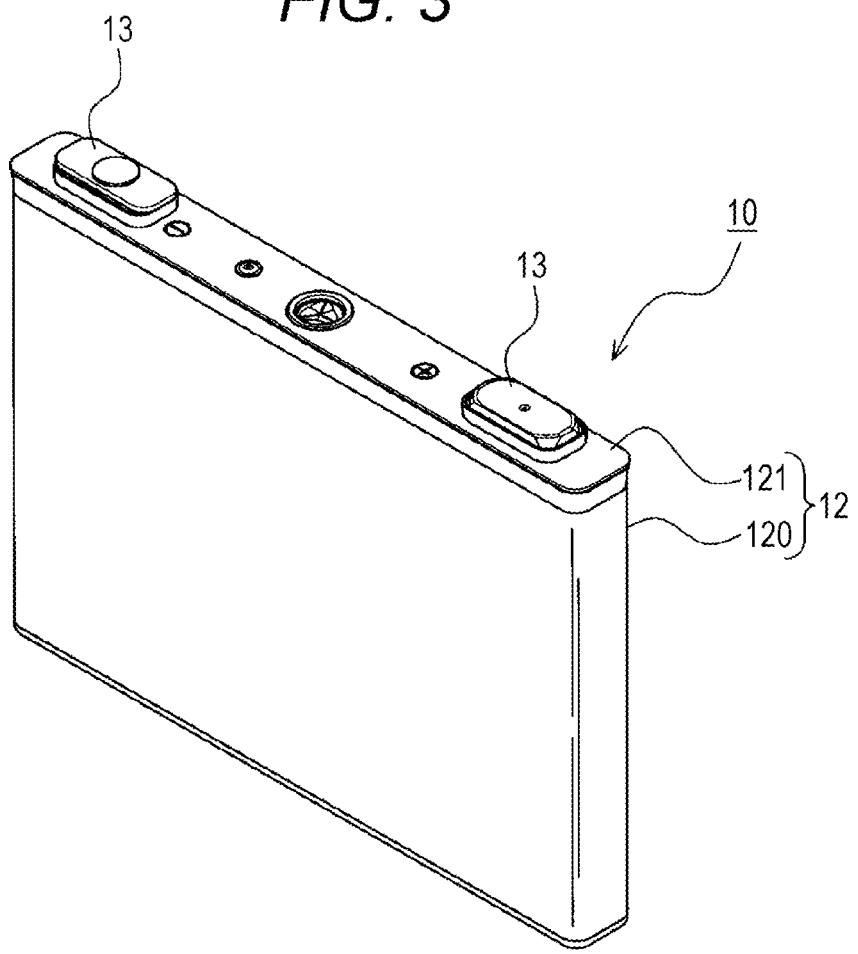
FIG. 3 is a perspective view of an energy storage device used in the energy storage apparatus.
Figure 4:
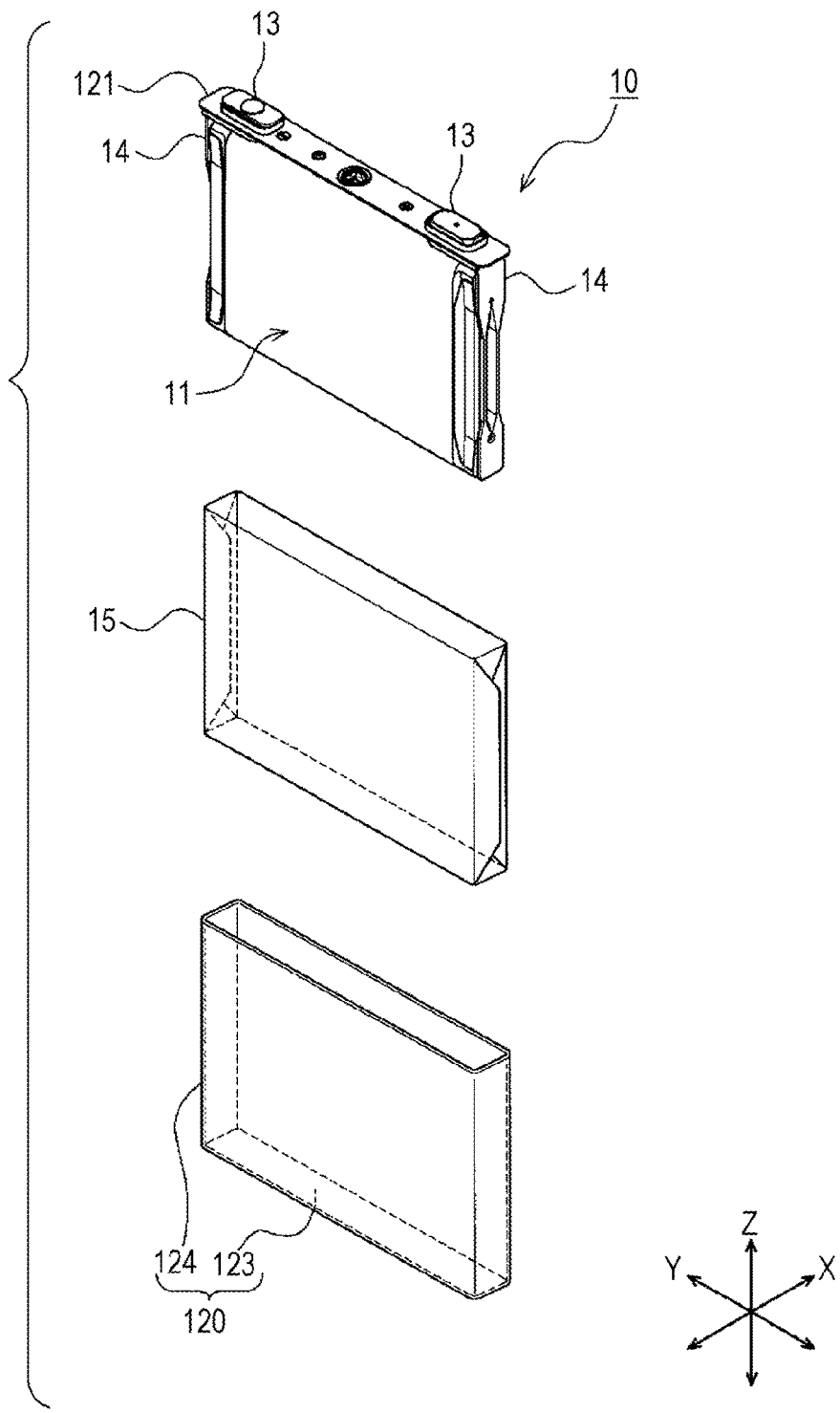
FIG. 4 is an exploded perspective view of the energy storage device.

As also shown in FIG. 3 and FIG. 4, each of the plurality of energy storage devices 10 includes: an electrode assembly 11 which includes a positive electrode and a negative electrode; a case 12 which houses the electrode assembly 11; and the pair of external terminals 13 disposed on an outer surface of the case 12.

The case 12 includes: a case body 120 having an opening; and a lid plate 121 which closes the opening of the case body 120. In this embodiment, the case 12 has a rectangular parallelepiped shape.

The case body 120 includes: a rectangular-plate-like closed portion 123; and a cylindrical barrel portion 124 which is connected to a periphery of the closed portion 123. The barrel portion 124 has a prismatic cylindrical shape along a profile of the closed portion 123, that is, a flat prismatic cylindrical shape. One end of the barrel portion 124 is closed by the closed portion 123, and the other end of the barrel portion 124 is opened. That is, the case body 120 has a flat bottomed prismatic cylindrical shape.

The lid plate 121 is a plate-like member which closes the opening of the case body 120. To be more specific, the lid plate 121 has a profile which corresponds to a peripheral edge portion of the opening of the case body 120 as viewed in the normal direction. In this embodiment, the pair of external terminals 13 is mounted on the lid plate 121 in a state where the pair of external terminals 13 is electrically connected to respective electrodes (the positive electrode, the negative electrode) of the electrode assembly 11. In this embodiment, on the lid plate 121, the pair of external terminals 13 is disposed in a spaced-apart manner in a longitudinal direction of the lid plate 121 having a rectangular shape.

With respect to the case 12 having the above-mentioned configuration, the opening of the case body 120 is closed by making a peripheral edge portion of the lid plate 121 overlap with the peripheral edge portion of the opening of the case body 120 in a state where the electrode assembly 11 is housed in the inside of the case 12, and a boundary portion between the lid plate 121 and the case body 120 is welded to each other in such a state.

In the energy storage apparatus 1 of this embodiment, the plurality of energy storage devices 10 each of which has the above-mentioned configuration are disposed. To be more specific, the plurality of energy storage devices 10 are arranged in a row such that wide wall portions of barrel portions 124 of the respective energy storage devices 10 opposedly face each other. In the description made hereinafter, the direction along which the energy storage devices 10 are arranged in a row (the direction along which the wide wall portions of the barrel portions 124 opposedly face each other: first direction) is assumed as "X axis direction" in orthogonal coordinates system. The direction along which narrow wall portions of the barrel portions 124 of the energy storage devices 10 opposedly face each other (third direction) is assumed as "Y axis direction" in orthogonal coordinates system, and the direction along which the lid plate 121 and the closed portion 123 of the energy storage device 10 opposedly face each other (second direction) is assumed as "Z axis direction" in orthogonal coordinates system. In accordance with such orthogonal coordinates system, orthogonal coordinate axes which respectively correspond to the X axis direction, the Y axis direction and the Z axis direction are described auxiliarily in the respective drawings.

Each adjacent member 2 is disposed between two energy storage devices 10 disposed adjacently to each other in the X axis direction or between the energy storage device 10 and a member which is disposed adjacently to the energy storage device 10 in the X axis direction (in this exemplified embodiment, a portion of the holder 3). As shown in FIG. 2, the adjacent members 2 include plural types of adjacent members. In this embodiment, the adjacent members 2 include: a first adjacent member (adjacent member) 21 which is disposed adjacently to the energy storage devices 10 disposed at an intermediate position in the X axis direction of the energy storage apparatus 1; second adjacent members 22 which are disposed adjacently to the outermost energy storage devices 10 out of the plurality of energy storage devices 10 arranged in a row in the X axis direction respectively; and third adjacent members 23 each of which is disposed adjacently to the energy storage devices 10 disposed between the first adjacent member 21 and the second adjacent members 22.

The first adjacent member 21 is disposed between the energy storage devices 10 which are disposed adjacently to each other in the X axis direction. With such a configuration, a predetermined distance (a creepage distance or the like) is ensured between the energy storage devices 10 which are disposed adjacently to each other in the X axis direction with the first adjacent member 21 interposed therebetween. The first adjacent member 21 is connected (fixed) to the holder 3.

To be more specific, the first adjacent member 21 has: a body portion (hereinafter referred to as "first body portion") 211 which is disposed adjacently to the energy storage device 10 (case body 120); and restricting portions (hereinafter referred to as "first restricting portions") 212 which restrict the movement of the energy storage devices 10 disposed adjacently to the first body portion 211 with respect to the first body portion 211. Further, the first adjacent member 21 has shaft portions 213 which engage with the holder 3.

The first body portion 211 has a rectangular profile which corresponds to the energy storage device 10 (case 12) disposed adjacently to the first body portion 211 as viewed in the X axis direction, and has connecting portions 2111 for fixing (connecting) the first body portion 211 to the holder 3. Further, flow channels 215 which allow a cooling fluid (air in an example of this embodiment) to pass therethrough are formed between the first body portion 211 and the energy storage devices 10 disposed adjacently to the first body portion 211 in the X axis direction. To be more specific, on the first body portion 211, a plurality of projecting portions 216 each of which projects toward the adjacent energy storage device 10 (in the X axis direction) and extends in the Y axis direction are arranged in a row at intervals in the Z axis direction. With such a configuration, distal ends (distal ends in the projecting direction) of the projecting portions 216 are brought into contact with the energy storage devices 10 disposed adjacently to the first body portion 211 thus forming the flow channels 215 between the first adjacent member 21 and the energy storage devices 10. Further, with respect to the first adjacent member 21 of this embodiment, a size in the X axis direction of the first body portion 211 is larger than sizes in the X axis direction of portions of the second adjacent member 22 and the third adjacent member 23 which corresponds to the first body portion 211.

The first body portion 211 has a projecting portion 2112. As shown also in FIG. 5, the projecting portion 2112 is formed on an end portion on one side of the first body portion 211 in the Z axis direction (in this exemplified embodiment, on a side of the energy storage device 10 which corresponds to the lid plate 121). The projecting portion 2112 is a portion which is formed by partially projecting one-side end surface of the first body portion 211. In this embodiment, the projecting portion 2112 is a portion having a rectangular parallelepiped shape which is disposed at a position where the projecting portion 2112 overlaps, in the Z axis direction, with the bus bar 5 which makes the external terminals 13 of the energy storage devices 10 disposed on both sides of the first adjacent member 21 conductive with each other.

The connecting portions 2111 are formed on end portions of the first body portion 211 in the Y axis direction respectively. In this embodiment, the connecting portions 2111 are formed on both end portions of the first body portion 211 in the Y axis direction respectively. The connecting portion 2111 is a portion with which a bolt B is threadedly engaged in a state where the bolt B penetrates the holder 3. In the energy storage apparatus 1, due to threaded engagement of the bolts B with the corresponding connecting portions 2111, the first body portion 211 (first adjacent member 21) and the holder 3 are connected to each other. In this embodiment, the connecting portions 2111 are nuts which are embedded into the end portions of the first body portion 211 in the Y axis direction.

The first restricting portions 212 extend in the X axis direction from the first body portion 211 and are brought into contact with the energy storage device 10 (to be more specific, the case 12) disposed adjacently to the first body portion 211 from the outside in the Y-Z plane (a plane including the Y axis and the Z axis) direction thus restricting the relative movement of the energy storage device 10 in the Y-Z plane direction with respect to the first body portion 211. The first restricting portions 212 extend in the X axis direction from at least respective corner portions of the first body portion 211 thus forming surfaces (contact surfaces) which are brought into contact with corner portions of the energy storage device 10 (case 12) disposed adjacently to the first body portion 211 from the outside in the Y-Z plane.

The shaft portions 213 extend outward from ends of the first body portion 211 in the Y axis direction, and engage with the holder 3. In this embodiment, the shaft portions 213 extend outward from both ends of the first body portion 211 in the Y axis direction respectively. To be more specific, the shaft portions 213 extend in a circular columnar shape in the Y axis direction from the end portions of the first body portion 211 in the Y axis direction at an intermediate position in the Z axis direction, and are made to pass through the through holes 3112 which are formed in the holder 3 at positions corresponding to the shaft portions 213. In this embodiment, the shaft portions 213 are used for positioning the first adjacent member 21 with respect to the holder 3 at the time of connecting (fixing) the first adjacent member 21 to the holder 3 in the manufacture of the energy storage apparatus 1.

As shown in FIG. 1 and FIG. 2, the second adjacent member 22 is disposed between the energy storage device 10 and the holder 3 in the X-axis direction. With such a configuration, a predetermined distance (a creepage distance or the like) is ensured between the energy storage device 10 and the holder 3 which are disposed in the X-axis direction adjacently to each other with the second adjacent member 22 interposed therebetween.

To be more specific, the second adjacent member 22 has: a body portion (hereinafter referred to as "second body portion") 221 disposed adjacently to the energy storage device 10 (case body 120) and between the energy storage device 10 and the holder 3; and restricting portions (hereinafter referred to as "second restricting portions") 222 which restrict the movement of the energy storage device 10 disposed adjacently to the second body portion 221 with respect to the second body portion 221.

The second body portion 221 has a rectangular profile corresponding to the energy storage device 10 (case 12) disposed adjacently to the second body portion 221 as viewed in the X axis direction. Further, flow channels 225 which allow a cooling fluid (air in this exemplified embodiment) to pass therethrough are formed between the second body portion 221 and the energy storage device 10 disposed adjacently to the second body portion 221 in the X axis direction. To be more specific, on the second body portion 221, a plurality of projecting portions 226 each of which projects toward the adjacent energy storage devices 10 (in the X axis direction) and extends in the Y axis direction are arranged in a row at intervals in the Z axis direction. With such a configuration, distal ends (distal ends in the projecting direction) of the projecting portions 226 are brought into contact with the energy storage device 10 disposed adjacently to the second body portion 221 thus forming the flow channels 225 between the second adjacent member 22 and the energy storage device 10.

The second restricting portions 222 extend in the X axis direction from the second body portion 221, and are brought into contact with the energy storage device 10 disposed adjacently to the second body portion 221 (to be more specific, the case 12) from the outside in the Y-Z plane direction thus restricting the relative movement of the energy storage device 10 in the Y-Z plane direction with respect to the second body portion 221. The second restricting portions 222 extend in the X axis direction from at least respective corner portions of the second body portion 221 thus forming surfaces (contact surfaces) which are brought into contact with corner portions of the energy storage device 10 (case 12) disposed adjacently to the second body portion 221 from the outside in the Y-Z plane direction.

Between the first adjacent member 21 and the second adjacent member 22, the third adjacent member 23 is disposed between each two of the energy storage devices 10 disposed adjacently to each other in the X axis direction. With such a configuration, a predetermined distance (a creepage distance or the like) is ensured between the energy storage devices 10 which are disposed adjacently to each other in the X axis direction with the third adjacent member 23 interposed therebetween.

To be more specific, the third adjacent member 23 has: a body portion (hereinafter referred to as "third body portion") 231 which is disposed adjacently to the energy storage device 10 (case body 120); and restricting portions (hereinafter referred to as "third restricting portions") 232 which restrict the movement of the energy storage devices 10 disposed adjacently to the third body portion 231 with respect to the third body portion 231.

The third body portion 231 has a rectangular profile which corresponds to the energy storage device 10 (case 12) disposed adjacently to the third body portion 231 as viewed in the X axis direction. Further, flow channels 235 which allow a cooling fluid (air in this exemplified embodiment) to pass therethrough are formed between the third body portion 231 and the energy storage devices 10 disposed adjacently to the third body portion 231 in the X axis direction. To be more specific, the third body portion 231 has a rectangular corrugated cross sectional shape. With such a configuration, the third body portion 231 is brought into contact with the energy storage devices 10 disposed adjacently to the third body portion 231 thus forming the flow channels 235 between the third body portion 231 and the energy storage devices 10.

The third restricting portions 232 extend in the X axis direction from the third body portion 231 and are brought into contact with the energy storage devices 10 (to be more specific, the cases 12) disposed adjacently to the third body portion 231 from the outside in the Y-Z plane direction thus restricting the relative movement of the energy storage devices 10 in the Y-Z plane direction with respect to the third body portion 231. The third restricting portions 232 extend in the X axis direction from at least respective corner portions of the third body portion 231 thus forming surfaces (contact surfaces) which are brought into contact with corner portions of the energy storage devices 10 (the case 12) disposed adjacently to the third body portion 231 from the outside in the Y-Z plane direction.

The holder 3 collectively holds the plurality of energy storage devices 10 and the plurality of adjacent members 2 by surrounding the peripheries of the plurality of energy storage devices 10 and the plurality of adjacent members 2. The holder 3 is made of a material having conductivity. To be more specific, the holder 3 includes: a pair of end members 30 which is disposed such that the plurality of energy storage devices 10 are positioned therebetween in the X axis direction; and oppositely facing members 31 which connect the pair of end members 30 to each other in a state where the oppositely facing members 31 oppositely face the plurality of energy storage devices 10 in the Y axis direction. In the energy storage apparatus 1 of this embodiment, the pair of end members 30 is disposed such that each of the pair of end members 30 sandwiches the second adjacent member 22 in cooperation with the energy storage device 10 disposed on an end of a unit formed of the plurality of energy storage devices 10 in the X axis direction, and the pair of oppositely facing members 31 is disposed on both sides in the Y axis direction of the unit formed of the plurality of energy storage devices 10 which are arranged in a row in the X axis direction.

The pair of end members 30 expands in the Y-Z plane direction respectively. To be more specific, each of the pair of end members 30 includes: a body 300 having a profile (a rectangular profile in this embodiment) which corresponds to the energy storage device 10; a pressure contact portion 301 which projects toward the second body portion 221 of the second adjacent member 22 from the body 300 and is brought into contact with the second adjacent member 22; and a support lug 302 on which the terminal base 7 is mounted. The support lug 302 is a plate-like portion which extends in the X axis direction from one of four sides (end edges) of the body 300 which form the profile of the body 300 and corresponds to the lid plate 121 of the energy storage device 10, and is elongated in the Y axis direction.

Each of the pair of oppositely facing members 31 includes: a pair of beam portions 310 which extends in the X axis direction and is disposed in a spaced-apart manner in the Z axis direction; a first connecting portion 311 which connects the pair of beam portions 310 to each other at an intermediate position in the X axis direction (in this exemplified embodiment, a position overlapping with the first adjacent member 21 in the Y axis direction); and a pair of second connecting portions 312 which connects end portions of the pair of beam portions 310 to each other. In this embodiment, the oppositely facing member 31 also includes third connecting portions 313 which connect the pair of beam portions 310 to each other between the first connecting portion 311 and the second connecting portions 312.

The pair of beam portions 310 extend along corner portions of the plurality of energy storage devices 10 (the cases 12) arranged in a row in the X axis direction. The first connecting portion 311 extends in the Z axis direction, and has through holes 3111, 3112 at positions corresponding to the connecting portion 2111 and the shaft portion 213 of the first adjacent member 21 (to be more specific, positions overlapping with the connecting portion 2111 and the shaft portion 213 of the first adjacent member 21 in the Y axis direction). The bolt B is made to pass through the through hole 3111, and the bolt B is threadedly engaged with the connecting portion 2111 of the first adjacent member 21. With such a configuration, the oppositely facing member 31 and the first adjacent member 21 are connected to each other. Further, the shaft portion 213 of the first adjacent member 21 is made to pass through the through hole 3112. The second connecting portion 312 extends in the Z axis direction, and is connected to the end member 30. With such a configuration, the end member 30 and the oppositely facing member 31 are connected (joined) to each other. The third connecting portions 313 extend in the Z axis direction at positions where the third connecting portions 313 overlap with the energy storage device 10 in the Y axis direction.

The insulators 4 are made of a material having an insulating property. Each insulator 4 is disposed between the oppositely facing member 31 and the plurality of energy storage devices 10 arranged in a row in the X axis direction. To be more specific, the insulators 4 cover at least regions of the holder 3 which oppositely face the plurality of energy storage devices 10. With such a configuration, the insulators 4 provide insulation between the holder 3 and the plurality of energy storage devices 10 arranged in a row in the X axis direction.

The bus bar 5 is a plate-like member which is made of a material having conductivity such as metal. The bus bar 5 includes plural kinds of bus bars. In this embodiment, the bus bar 5 includes: intermediate bus bars 50 each of which connects the external terminals 13 of the adjacent energy storage devices 10 to each other in a conductive manner; and end-portion bus bars 53 each of which connects the external terminal 13 of the energy storage device 10 and the total terminal 71 of the energy storage apparatus 1 to each other in a conductive manner.

The plurality of intermediate bus bars 50 (the number of the intermediate bus bars 50 corresponding to the number of the plurality of energy storage devices 10) are provided to the energy storage apparatus 1. The plurality of intermediate bus bars 50 connect all of the plurality of energy storage devices 10 included in the energy storage apparatus 1 in series (or make all of the plurality of energy storage devices 10 conductive with each other). Further, the plurality of intermediate bus bars 50 include: a first bus bar 51 which makes the external terminals 13 of the energy storage devices 10 disposed adjacently to each other with the first adjacent member 21 interposed therebetween conductive with each other (that is, connecting the energy storage devices 10 to each other while straddling over the first adjacent member 21); and second bus bars 52 each of which makes the external terminals 13 of the energy storage devices 10 disposed adjacently to each other conductive with each other with the third adjacent member 23 interposed therebetween (that is, connecting the energy storage devices 10 to each other while straddling the third adjacent member 23). In this embodiment, the energy storage apparatus 1 includes one first bus bar 51, the plurality of second bus bars 52, and the pair of end portion bus bars 53.

Figure 5:
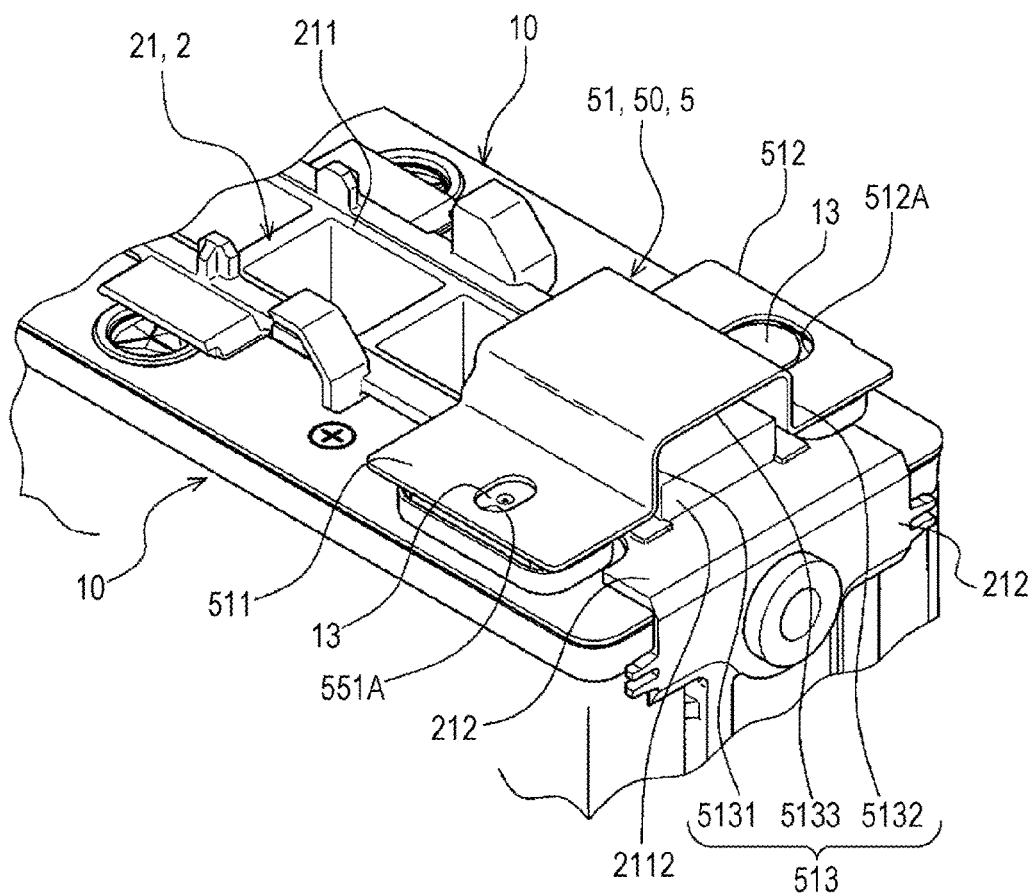
FIG. 5 is an enlarged perspective view of a first bus bar and parts around the first bus bar in the energy storage apparatus.
Figure 5:
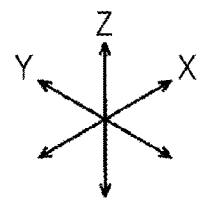

As shown in FIG. 5, the first bus bar 51 includes, between one external terminal 13 and the other external terminal 13 which are electrically connected to each other, at least one portion out of a portion which extends in a projecting manner in a direction (in an upward direction in FIG. 5) away from the first adjacent member 21 in the Z axis direction in a state where the portion is spaced-apart from the first adjacent member 21, and a portion which extends in a recessed manner in a direction (in a downward direction in FIG. 5) that the portion approaches the first adjacent member 21 in the Z axis direction in a state where the portion is spaced-apart from the first adjacent member 21. In this embodiment, the first bus bar 51 includes the portion which extends in a projecting manner (hereinafter also referred to as "buffer portion") 513. The buffer portion 513 of the first bus bar 51 has a shape which conforms to the projecting portion 2112 of the first adjacent member 21. In this embodiment, the first bus bar 51 is formed by applying bending or the like to a rectangular plate-like member. To be more specific, the first bus bar 51 has the following configuration.

The first bus bar 51 includes: a first fixed portion (first connecting portion) 511 which is fixed to the external terminal 13 of the energy storage device 10 disposed adjacently to the first adjacent member 21 on one side (a left side in FIG. 5) in the X axis direction; a second fixed portion (second connecting portion) 512 which is fixed to the external terminal 13 of the energy storage device 10 disposed adjacently to the first adjacent member 21 on the other side (a right side in FIG. 5) in the X axis direction; and the buffer portion 513 which connects the first fixed portion 511 and the second fixed portion 512 to each other. That is, the first bus bar 51 connects the external terminals 13 of the energy storage devices 10 disposed adjacently to each other such that the first adjacent member 21 is positioned between the energy storage devices 10. The first bus bar 51 connects the external terminals 13 of the energy storage devices 10 disposed adjacently to both sides of the first adjacent member 21 such that the first bus bar 51 straddles over the first adjacent member 21 in a non-contact state with the first adjacent member 21. In this embodiment, the first bus bar 51 is formed by applying bending or the like to a rectangular plate-like member.

The first fixed portion 511 is a portion expanding in the X-Y plane (a plane including the X axis and the Y axis) direction and having a rectangular shape as viewed in the Z axis direction. The first fixed portion 511 has a through hole 511A at a center portion thereof. In this embodiment, the first fixed portion 511 is fixedly mounted on the external terminal 13 by being welded along a peripheral edge of the through hole 511A. In this embodiment, the first fixed portion 511 is fixedly mounted on the positive electrode external terminal 13 of the energy storage device 10.

The second fixed portion 512 is a portion expanding in the X-Y plane direction and having a rectangular shape as viewed in the Z axis direction. The second fixed portion 512 has a through hole 512A at a center portion thereof. The through hole 512A of the second fixed portion 512 is larger than the through hole 511A of the first fixed portion 511. In this embodiment, the second fixed portion 512 is fixedly mounted on the external terminal 13 by being welded along a peripheral edge of the through hole 512A. In this embodiment, the second fixed portion 512 is fixedly mounted on the negative electrode external terminal 13 of the energy storage device 10.

The buffer portion 513 includes: a first raised portion 5131 which is raised (extends in the Z axis direction) from an end of the first fixed portion 511; a second raised portion 5132 which is raised (extends in the Z axis direction) from an end of the second fixed portion in a spaced-apart manner from the first raised portion 5131 in the X axis direction; and a bridging portion 5133 which extends in the X axis direction and connects a distal end of the first raised portion 5131 and a distal end of the second raised portion 5132 to each other. The bridging portion 5133 extends along the X axis direction.

Figure 6:
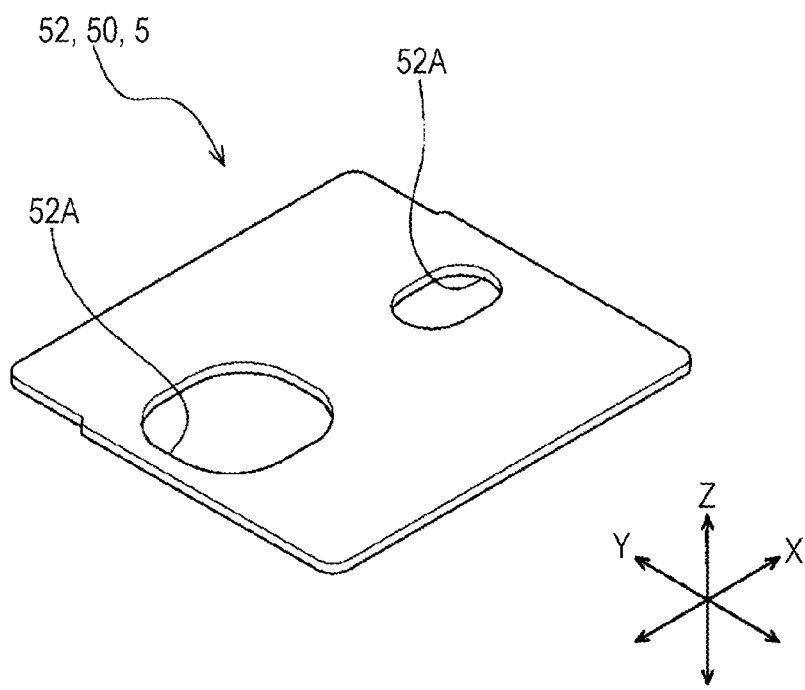
FIG. 6 is a perspective view of a second bus bar.

As shown in FIG. 1, FIG. 2 and FIG. 6, the second bus bar 52 has an approximately rectangular plate shape extending in the X axis direction (to be more specific, expanding in the X-Y plane direction), and has two through holes 52A at both ends thereof in the X axis direction. These two through holes 52A differ from each other in size. In the energy storage apparatus 1 of this embodiment, a portion (end portion) of the second bus bar 52 in which the larger through hole 52A is formed is connected to the negative electrode external terminal 13, and a portion (an end portion) of the second bus bar 52 in which the smaller through hole 52A is formed is connected to the positive electrode external terminal 13.

Figure 7:
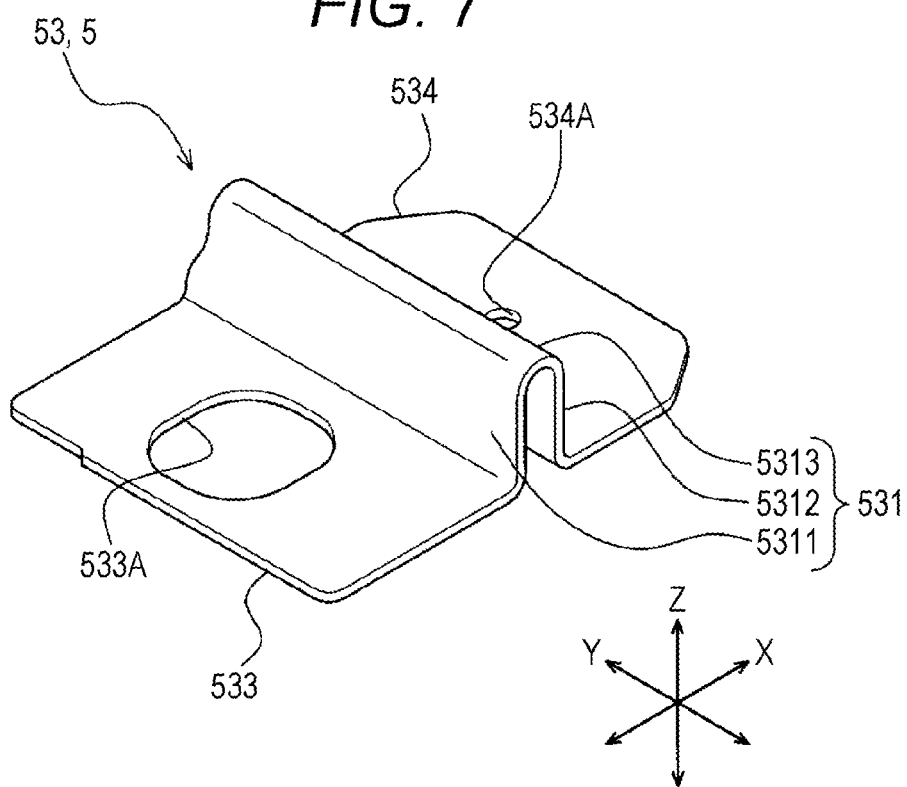
FIG. 7 is a perspective view of an end portion bus bar.

As shown in FIG. 1, FIG. 2 and FIG. 7, one of the pair of end portion bus bars 53 is provided for making one terminal base 7 (the total terminal 71) and the external terminal 13 of the energy storage device 10 disposed on an end portion of a unit of the plurality of energy storage devices 10 connected in series on one electrode side (for example, positive electrode side) conductive with each other. The other of the pair of end portion bus bars 53 is provided for making the other terminal base 7 (the total terminal 71) and the external terminal 13 of the energy storage device 10 disposed on an end portion of the unit of the plurality of energy storage devices 10 connected in series on the other electrode side (for example, the negative electrode side) conductive with each other.

In this embodiment, the end portion bus bar 53 is a plate-like member extending in the X axis direction. The end portion bus bar 53 has a route-around portion 531 which extends in a route-around manner as viewed in the Y axis direction at an intermediate portion thereof in the X axis direction. To be more specific, the end portion bus bar 53 includes: a third fixed portion 533 which is fixedly mounted on the terminal base 7; a fourth fixed portion 534 which is fixedly mounted on the external terminal 13 of the energy storage device 10; and the route-around portion 531 which connects the third fixed portion 533 and the fourth fixed portion 534 to each other. The third fixed portion 533 and the fourth fixed portion 534 are respectively formed of a rectangular plate-like portion expanding in the X-Y plane direction. The third fixed portion 533 has a through hole 533A, and the fourth fixed portion 534 has a through hole 534A. The through holes 533A, 534A differ from each other in size. In this embodiment, the route-around portion 531 includes: a third raised portion 5311 which is raised (extends in the Z axis direction) from an end of the third fixed portion 533; a fourth raised portion 5312 which is raised (extends in the Z axis direction) from an end of the fourth fixed portion 534 in a spaced-apart manner from the third raised portion 5311 in the X axis direction; and a bent portion 5313 which connects a distal end of the third raised portion 5311 and a distal end of the fourth raised portion 5312 to each other and has a circular arc shape as viewed in the Y axis direction.

Figure 8:
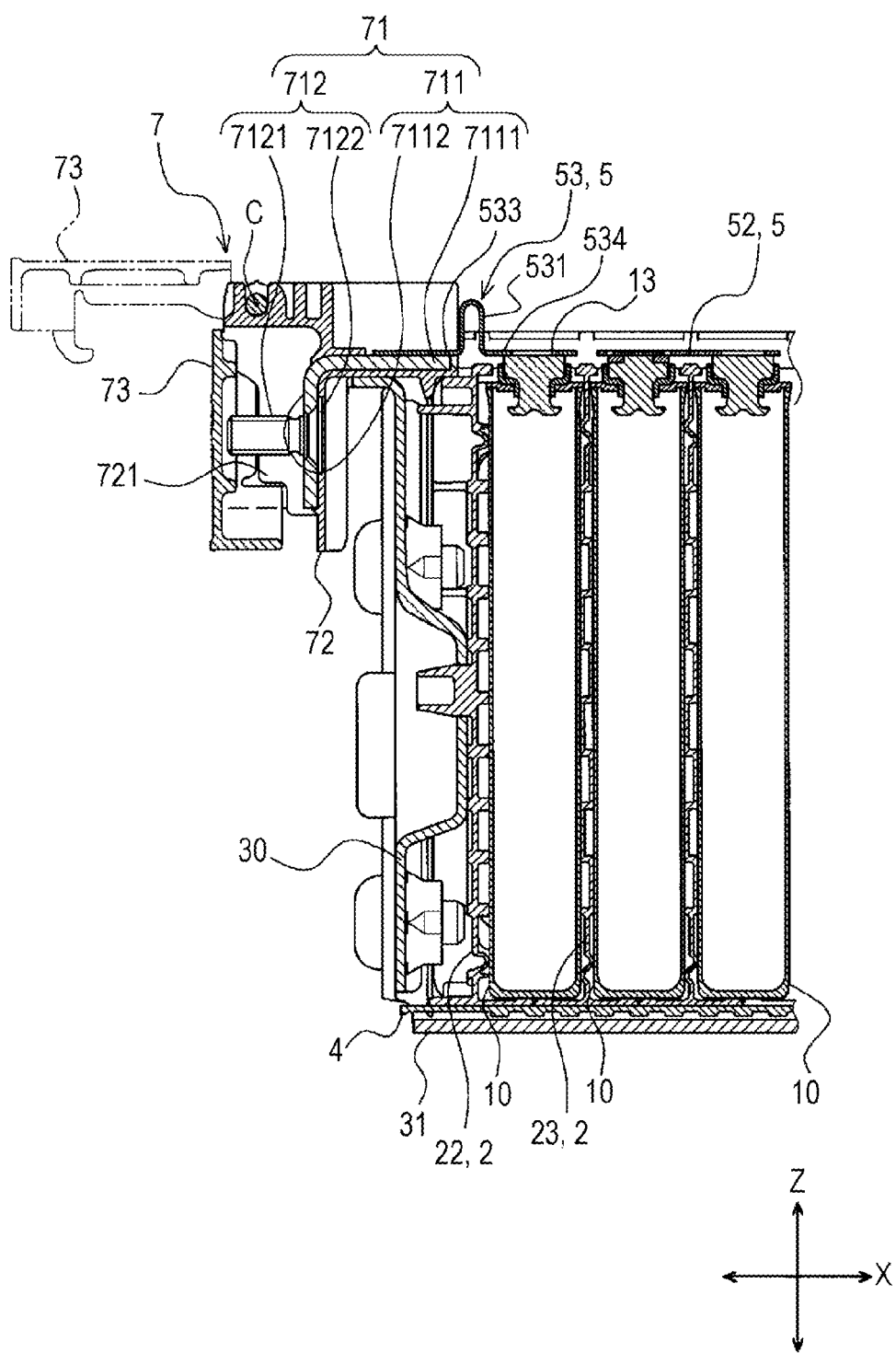
FIG. 8 is a cross-sectional view of the energy storage apparatus taken along a line X-X in FIG. 1, and is a cross-sectional view of a terminal base and parts around the terminal base.

As shown in FIG. 1, FIG. 2 and FIG. 8, the terminal base 7 includes: the total terminal 71 which is connected to external equipment, another energy storage apparatus 1 or the like; and a base portion 72 which is mounted on the holder 3 and supports the total terminal 71. In this embodiment, the terminal base 7 also includes a terminal cover 73 which covers the total terminal 71 so as to prevent the total terminal 71 from being brought into contact with a person, other members or the like when the energy storage apparatus 1 is not in use or the like. In this embodiment, the total terminal 71 includes: a plate-like member 711 to which the end portion bus bar 53 (to be more specific, the third fixed portion 533) is connected (fixedly mounted); and a screw member 712 which is used for fixing a terminal of external equipment or the like.

The plate-like member 711 is made of a material having conductivity. In this embodiment, the plate-like member 711 is a member having an L shape as viewed in the Y axis direction, that is, is a plate-like member which is bent at an intermediate position thereof. To be more specific, the plate-like member 711 includes: a first portion 7111 which extends in a predetermined direction (in the X axis direction in this exemplified embodiment) and is fixed to the end member 30 by way of the base portion 72; and a second portion 7112 which extends from the first portion 7111 in a direction which intersects with the predetermined direction (in the Z axis direction in this exemplified embodiment).

The screw member 712 projects from the plate-like member 711 (from the second portion 7112 in this exemplified embodiment). To be more specific, the screw member 712 includes: a male screw portion 7121 which extends in the X axis direction from the second portion 7112; and a head portion 7122 which expands in the Y-Z plane direction on one end of the male screw portion 7121.

The base portion 72 is fixed to the end member 30, and supports the plate-like member 711 on a side where the end member 30 is positioned with respect to the plate-like member 711. The base portion 72 has a pair of side wall portions 721 which oppositely faces each other such that the male screw portion 7121 (the screw member 712) which penetrates the second portion 7112 of the plate-like member 711 is positioned between the pair of side wall portions 721. The terminal cover 73 is mounted on end portions of the pair of side wall portions 721 in the Z axis direction (upper end portions in FIG. 8) in a rotatable manner using a predetermined axis C extending in the Y axis direction as the center of rotation. In a state where the terminal cover 73 is closed (a state where the terminal cover 73 extends between end edges of the pair of side wall portions 721), the total terminal 71 is surrounded by the pair of side wall portions 721 and the terminal cover 73 (to be more specific, the second portion 7112 and the screw member 712 of the plate-like member 711 are surrounded). On the other hand, in a state where the terminal cover 73 is opened (a state where the terminal cover 73 is rotated using the predetermined axis C as the center of rotation: see FIG. 2, a double dashed chain line in FIG. 8), a distal end side of the screw member 712 is brought into an open state.

Figure 9:
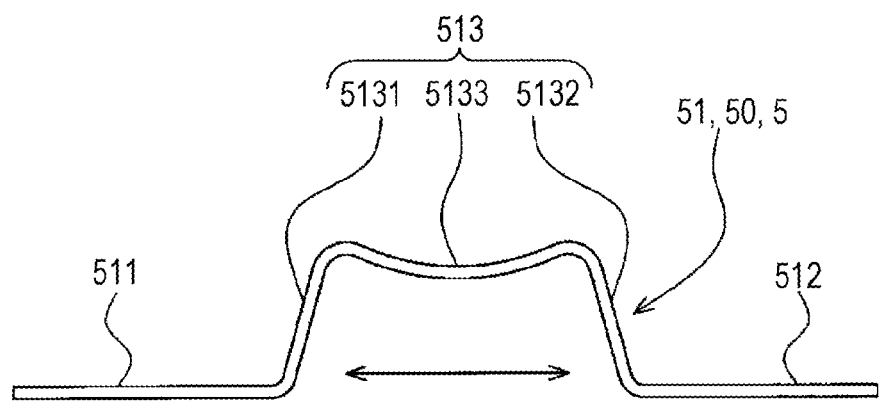
FIG. 9 is a schematic view showing the first bus bar in a state where a distance between the energy storage devices which are connected to each other by the first bus bar is widened.
Figure 10:
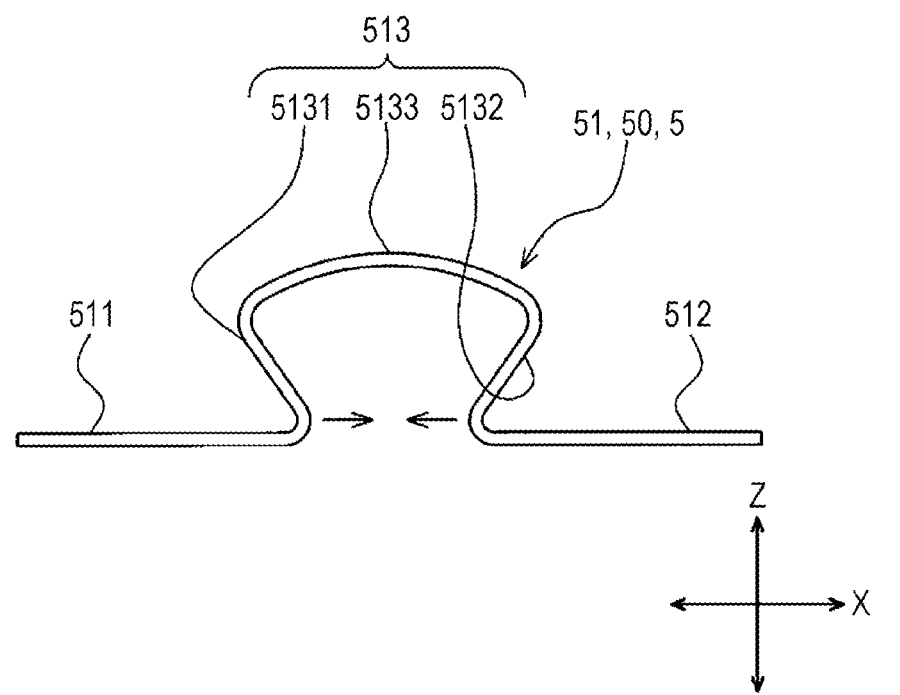
FIG. 10 is a schematic view showing the first bus bar in a state where the distance between the energy storage devices which are connected to each other by the first bus bar is narrowed.

According to the energy storage apparatus 1 having the above-mentioned configuration, even when a distance between the energy storage devices 10 disposed on both sides of the first adjacent member 21 changes due to a difference in a moving distance between the holder 3 (the first adjacent member 21), the energy storage device 10 disposed on one side of the first adjacent member 21 and the energy storage device 10 disposed on the other side of the first adjacent member 21 when acceleration in the X axis direction or the like is applied to the energy storage apparatus 1, as shown in FIG. 9 and FIG. 10, the buffer portion 513 of the first bus bar 51 which connects the external terminals 13 of the energy storage devices 10 to each other expands or contracts (to be more specific, since the bridging portion 5133 is bent, a distance between an end portion of the first raised portion 5131 on a first fixed portion 511 side and an end portion of the second raised portion 5132 on a second fixed portion 512 side expands or contracts). With such a configuration, it is possible to suppress the concentration of a stress caused by the change in the distance on the first fixed portion 511 and the second fixed portion 512 of the first bus bar 51 (portions of the first bus bar 51 connected to the external terminals 13). Accordingly, it is possible to prevent the occurrence of damage on the first bus bar 51 caused by a change in the distance. That is, the first bus bar 51 which connects the external terminals 13 of the energy storage devices 10 disposed on both sides of the first adjacent member 21 is hardly damaged.

In the energy storage apparatus 1 of this embodiment, the first adjacent member 21 is fixed to the holder 3, and the plurality of energy storage devices 10 are held by the holder 3 by being surrounded by the holder 3. When an acceleration in the first direction is applied to the energy storage apparatus 1, although the relative displacement between the first adjacent member 21 and the holder 3 hardly occurs, the relative displacement is liable to occur between the energy storage device 10 and the holder 3 and between the energy storage device 10 and the first adjacent member 21. Accordingly, a distance between the energy storage devices 10 disposed on both sides of the first adjacent member 21 is liable to change largely. The first bus bar 51 of this embodiment is particularly effectively applicable to such an energy storage apparatus 1.

In the energy storage apparatus 1 of this embodiment, the route-around portion 531 is provided to the end portion bus bar 53 which connects the external terminal 13 of one energy storage device 10 among the energy storage devices 10 arranged in a row in the X axis direction and the total terminal 71 fixed to the end member 30 to each other. Accordingly, even when a distance between the total terminal 71 and the external terminal 13 changes due to a difference in moving distance between the holder 3 (the end member 30) and the energy storage device 10 disposed adjacently to the end member 30 when acceleration in the X axis direction or the like is applied to the energy storage apparatus 1, the route-around portion 531 of the end portion bus bar 53 which extends in a projecting manner expands or contracts and hence, it is possible to suppress the concentration of a stress caused by a change in the distance on the portion of the end portion bus bar 53 which is connected to the total terminal 71 and the portion of the end portion 53 which is connected to the external terminal 13. With such a configuration, it is possible to prevent the occurrence of damage on the end portion bus bar 53 caused by a change in the distance. That is, the end portion bus bar 53 which connects the external terminal 13 of the energy storage device 10 and the total terminal 71 fixed to the holder 3 to each other is hardly damaged.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the energy storage apparatus 1 of this embodiment, the first bus bar 51 includes one projecting buffer portion 513 (a portion extending in a projecting manner in a direction away from the first adjacent member 21 in the Z axis direction in a state where the portion is spaced-apart from the first adjacent member 21) between the first fixed portion 511 and the second fixed portion 512. However, the energy storage apparatus 1 of this embodiment is not limited to such a configuration.

Figure 11:
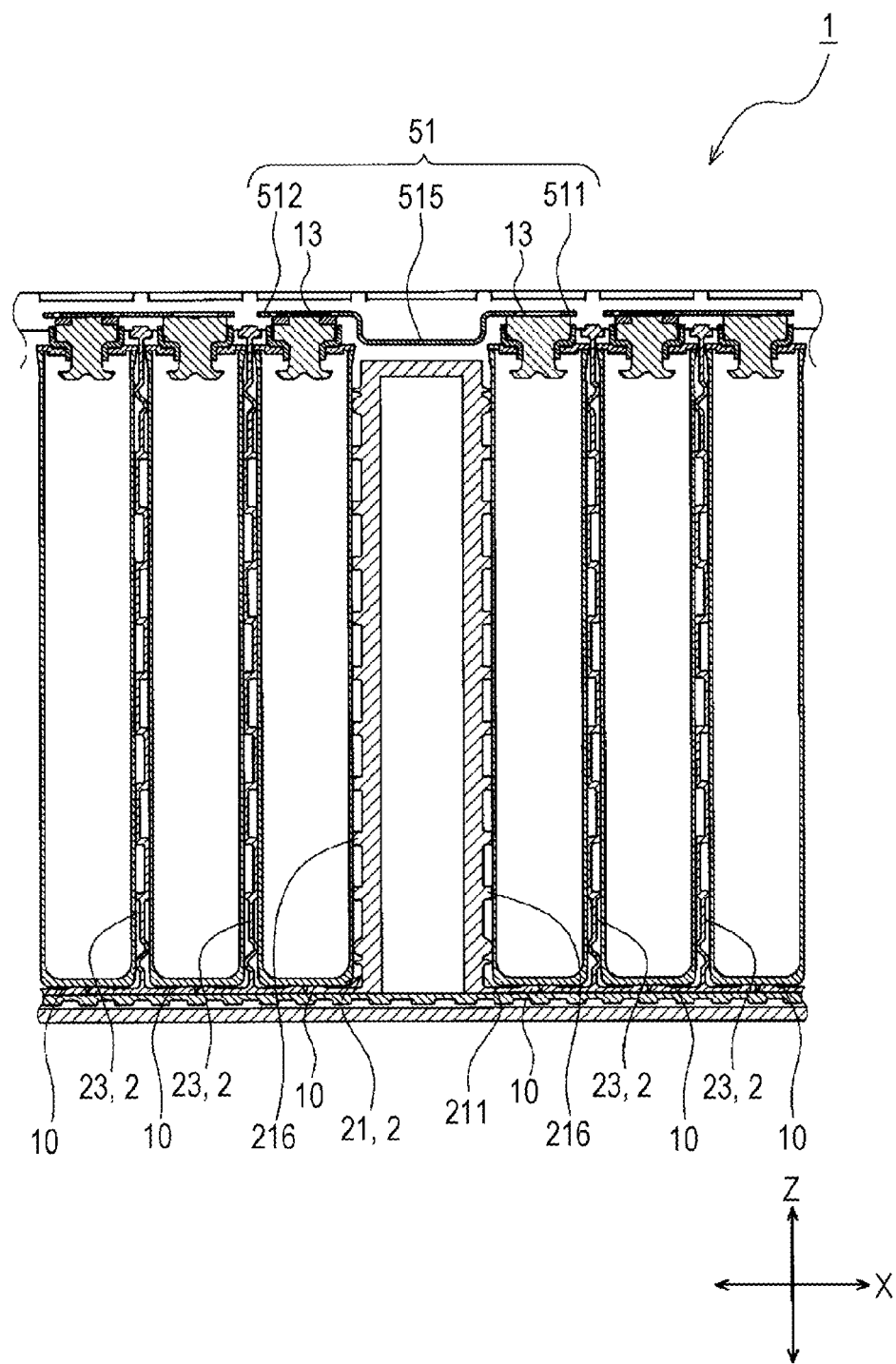
FIG. 11 is a view for describing the first bus bar having a concave-shaped buffer portion.

For example, as shown in FIG. 11, the first bus bar 51 may include a recessed-shaped buffer portion 515 (a portion extending in a recessed manner toward a direction that the portion approaches the first adjacent member 21 in the Z axis direction in a state where the portion is spaced-apart from the first adjacent member 21) between the first fixed portion 511 and the second fixed portion 512. Further, the first bus bar 51 may include a plurality of projecting buffer portions 513 or a plurality of recessed buffer portions 515 between the first fixed portion 511 and the second fixed portion 512.

Figure 12:
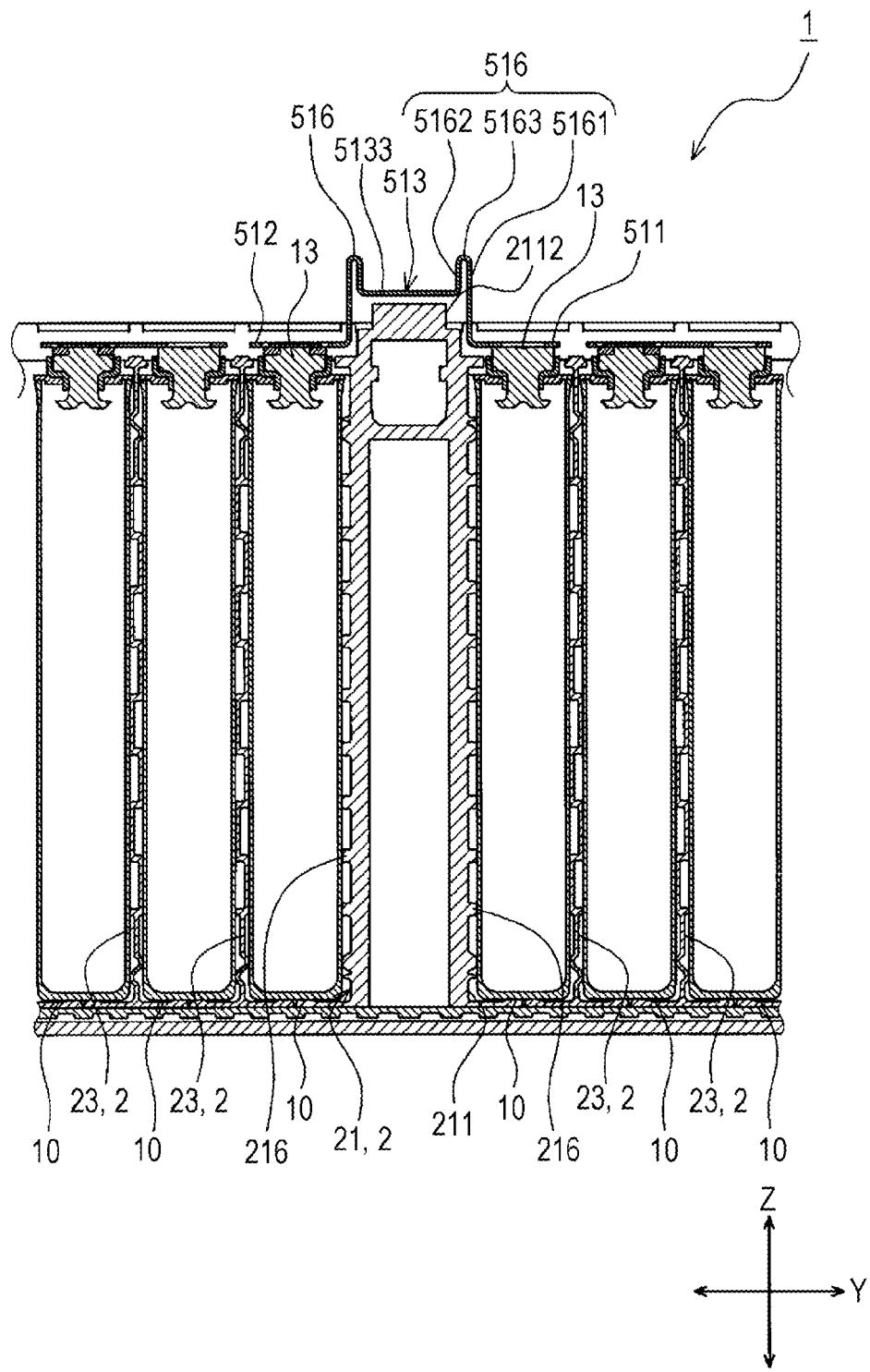
FIG. 12 is a view for describing the first bus bar including the buffer portion having a bypassing portion.

As shown in FIG. 12, a buffer portion 513 may include a route-around portion 516 which extends in a route-around manner as viewed in the Y axis direction. That is, the first bus bar 51 may include a bent portion formed by curving, bending or the like in the buffer portion 513 at least one of between a first raised portion 5131 and a bridging portion 5133 and between a second raised portion 5132 and the bridging portion 5133. A plurality of bent portions may be disposed in one route-around portion 516. For example, the route-around portion 516 includes: a third raised portion 5161 which is raised (extends in the Z axis direction) from an end of the first fixed portion 511; a fourth raised portion 5162 which is raised (extends in the Z axis direction) from an end of the bridging portion 5133 in a spaced-apart manner from the third raised portion 5161 in the X axis direction; and a bent portion 5163 which connects a distal end of the third raised portion 5161 and a distal end of the fourth raised portion 5162 to each other and has a circular arcuate shape as viewed in the Y axis direction. With such a configuration, when a distance between the energy storage devices 10 disposed on both sides of the first adjacent member 21 changes, the route-around portion 516 also expands or contracts in addition to the buffer portion 513 and hence, it is possible to further effectively suppress the concentration of a stress caused by the change in the distance on the first fixed portion 511 and the second fixed portion 512 of the first bus bar 51 (the portions connected to the external terminals 13). In the example shown in FIG. 12, the buffer portion 513 includes two route-around portions 516. However, the number of route-around portions 516 may be set to one or three or more.

The energy storage apparatus 1 of the above-mentioned embodiment includes the terminal bases 7. However, the energy storage apparatus 1 is not limited to such a configuration. The energy storage apparatus 1 may not include the terminal bases 7. In this case, in a plurality of energy storage devices 10 which are connected to each other in series by a plurality of bus bars 5, bus bars 5 which are connected to external terminals 13 positioned at outermost ends (the end on a positive electrode side and the end on a negative electrode side) of a current path respectively function as total terminals.

In the energy storage apparatus 1 of the above-mentioned embodiment, the first bus bar 51 connects two external terminals 13 to each other (makes two external terminals 13 conductive with each other). However, the energy storage apparatus 1 is not limited to such a configuration. The first bus bar 51 may be configured to connect three or more external terminals 13 to each other. For example, to be more specific, a first fixed portion 511 may be fixedly mounted on two or more external terminals 13 on one side of a first adjacent member 21 in the X axis direction, and a second fixed portion 512 may be fixedly mounted on two or more external terminals 13 on the other side of the first adjacent member 21 in the X axis direction.

Figure 13:
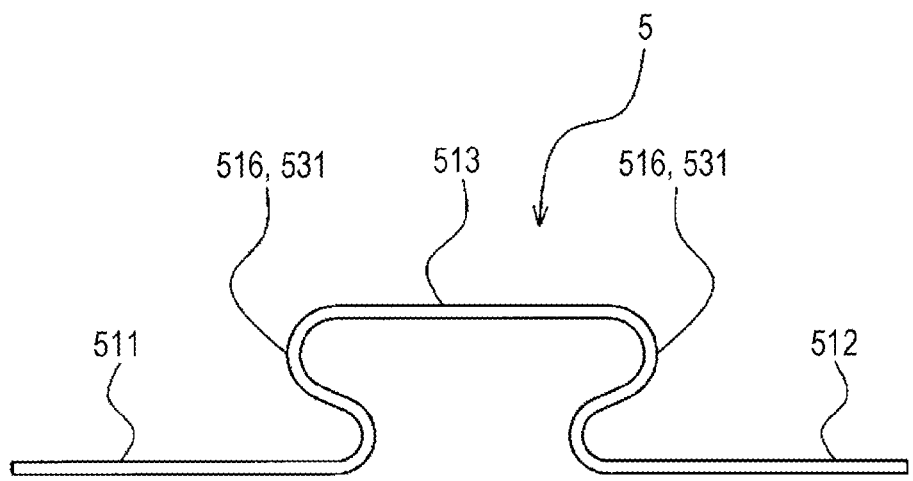
FIG. 13 is a schematic view for describing a bypassing portion according to another embodiment.

Further, the specific configuration of the route-around portion provided to the bus bar 5 is not limited. In the above-mentioned embodiment, the route-around portion 516, 531 extends in a route-around manner such that the route-around portions 516, 531 project in the Z axis direction as viewed in the Y axis direction. However, for example, as shown in FIG. 13, route-around portion 516, 531 may extend in a route-around manner such that the route-around portion 516, 531 projects in the X axis direction. That is, it is sufficient for the route-around portion 516, 531 to have a configuration where the route-around portion 516, 531 includes one or a plurality of bent portions, curved portions or the like so that, when a distance in the X axis direction between the plurality of energy storage devices 10 which are connected to each other by the bus bars 5 changes, the route-around portion 516, 531 absorbs such a change in distance thus preventing the concentration of a stress on the connecting portion between the bus bar 5 and the external terminal 13.

Figure 14:
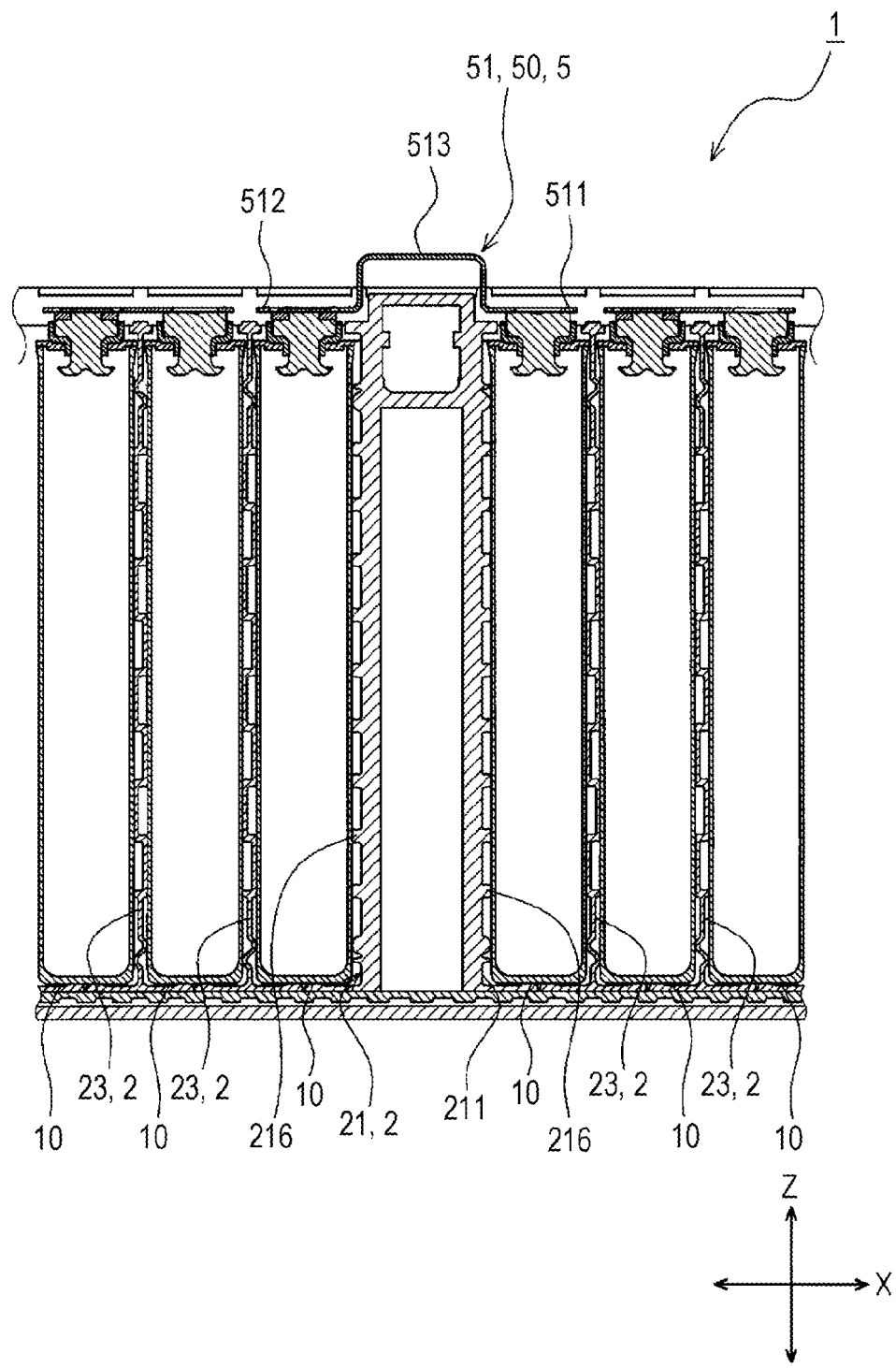
FIG. 14 is a view for describing a first adjacent member having no projecting portion.

In the energy storage apparatus 1 according to the embodiment or another embodiment described above, the adjacent member 2 over which the bus bar 5 including the buffer portion 513, 515 straddles includes the projecting portion 2112. However, the energy storage apparatus 1 according to this embodiment is not limited to such a configuration. For example, as shown in FIG. 11 and FIG. 14, a configuration may be adopted where an adjacent member 2 over which a bus bar 5 including the buffer portion 513, 515 straddles may not include the projecting portion. That is, an end surface of the adjacent member 2 on a bus bar 5 side may be formed in a flat shape.

In the energy storage apparatus 1 of the above-mentioned embodiment, the first adjacent member 21 is fixed to the holder 3. However, the energy storage apparatus 1 is not limited to such a configuration. For example, the first adjacent member 21 may be fixed to the support body. The support body means a structural body such as a portion of a packing casing which houses the energy storage apparatus 1 therein, a chassis of a vehicle or a duct. Also in these cases, in the same manner as the case where the first adjacent member 21 is fixed to the holder 3, a distance between the energy storage devices 10 disposed on both sides of the first adjacent member 21 is liable to change largely due to acceleration generated in the energy storage apparatus 1.

Figure 15:
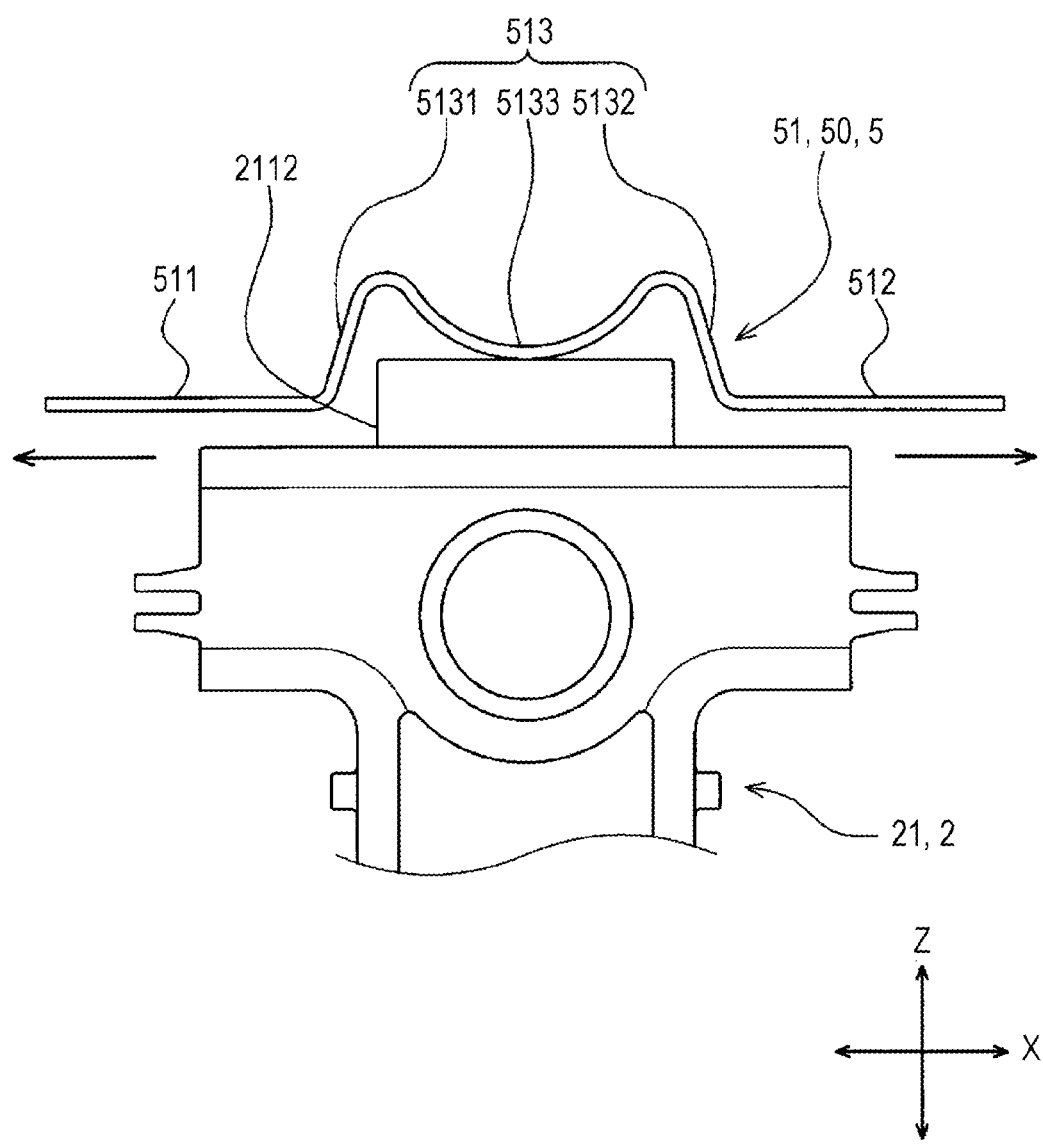
FIG. 15 is a view for describing a distance between a first bus bar and a projecting portion according to another embodiment in a state where a distance between energy storage devices on both sides of a first adjacent member is widened.
Figure 16:
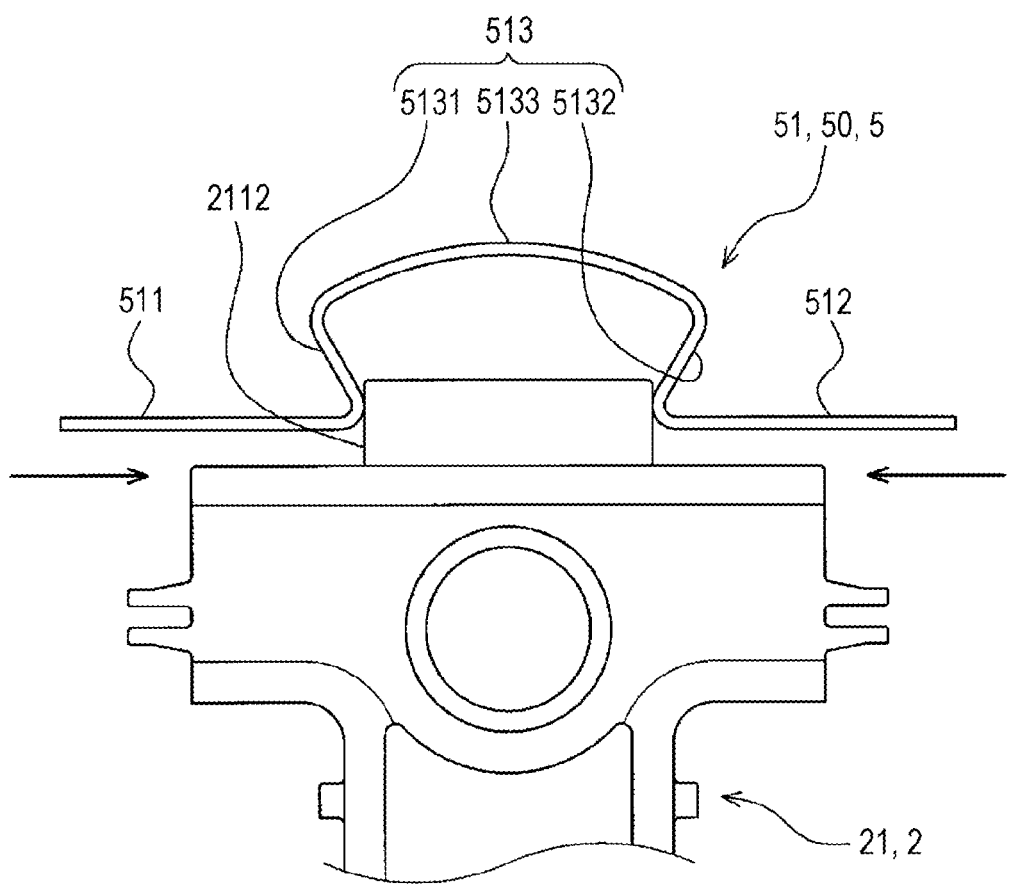
FIG. 16 is a view for describing a distance between a first bus bar and a projecting portion according to still another embodiment in a state where a distance between energy storage devices on both sides of a first adjacent member is small.

In the energy storage apparatus 1 of the above-mentioned embodiment, a sufficient distance is ensured between the first bus bar 51 and the projecting portion 2112 so as to prevent the first bus bar 51 and the projecting portion 2112 of the first adjacent member 21 from being brought into contact with each other in a normal use state of the energy storage apparatus 1. However, the energy storage apparatus 1 is not limited to such a configuration. For example, as shown in FIG. 15 and FIG. 16, a distance between the first bus bar 51 and the projecting portion 2112 may be set such that when a distance between the energy storage devices 10 disposed on both sides of the first adjacent member 21 is intended to change more than a predetermined amount, at least a portion of the first bus bar 51 is brought into contact with the projecting portion 2112 thus preventing a change in distance which exceeds a predetermined amount. To be more specific, the distance between the first bus bar 51 and the projecting portion 2112 may be set as follows. That is, when a distance between the energy storage devices 10 disposed on both sides of the first adjacent member 21 is intended to decrease by a predetermined amount or more, a portion of the first bus bar 51 (the first raised portion 5131 and the second raised portion 5132 in the example shown in FIG. 15 and FIG. 16) is brought into contact with the projecting portion 2112 thus preventing the decrease of the distance. On the other hand, when the distance between the energy storage devices 10 disposed on both sides of the first adjacent member 21 is intended to increase by a predetermined amount or more, other portion of the first bus bar 51 (the bridging portion 5133 in the example shown in FIG. 15 and FIG. 16) is brought into contact with the projecting portion 2112 thus preventing the increase of the distance.

With such a configuration, when a change in distance between the energy storage devices 10 disposed adjacently to each other with the first adjacent member 21 interposed therebetween falls within an allowable range, it is possible to suppress the concentration of a stress caused by a change (fluctuation) in the distance on the first fixed portion 511 and the second fixed portion 512 due to the deformation of the buffer portion 513 of the first bus bar 51. On the other hand, when the distance exceeds an allowable range (a change in distance by a predetermined amount or more), a portion of the first bus bar 51 is brought into contact with the projecting portion 2112 (the first raised portion 5131 or the second raised portion 5132 being brought into contact with the projecting portion 2112 or the bridging portion 5133 being brought into contact with the projecting portion 2112 in the example shown in FIG. 15 and FIG. 16) thus preventing a change in distance which exceeds the above-mentioned allowable range.

What is claimed is:

1. An energy storage apparatus, comprising:
a plurality of energy storage devices which respectively have an external terminal and are arranged in a row in a first direction;
an adjacent member disposed between the energy storage devices disposed adjacently to each other in the first direction;
a holder provided for holding the plurality of energy storage devices and the adjacent member by surrounding a periphery of the plurality of energy storage devices and the adjacent member; and
a bus bar which is configured to make the external terminals of the energy storage devices disposed on both sides of the adjacent member among the plurality of energy storage devices conductive with each other,
wherein the bus bar includes:
a first connecting portion connected to one external terminal which is made conductive by the bus bar;
a second connecting portion connected to the other external terminal which is made conductive by the bus bar; and
a portion which extends in a projecting manner in a direction away from the adjacent member in a second direction orthogonal to the first direction, and
wherein the holder includes:
a pair of end members which is disposed such that the plurality of energy storage devices are positioned therebetween in the first direction; and
an oppositely facing member which is electrically conductive and connects the air of end members to each other in a state where the oppositely facing member oppositely faces the plurality of energy storage devices, and
wherein the adjacent member is fixed to the oppositely facing member of the holder, and the portion which extends in the projecting manner includes: a first raised portion extending in the second direction from the first connecting portion; and a second raised portion extending in the second direction from the second connecting portion, wherein at least a portion of the adjacent member is disposed between the first raised portion and the second raised portion, wherein the portion of the adjacent member extends above a level of the first connecting portion and the second connecting portion.

2. The energy storage apparatus according to claim 1, wherein the bus bar includes a bent portion at least one of between the first raised portion and the bridging portion and between the second raised portion and the bridging portion.

3. The energy storage apparatus according to claim 1, wherein the bus bar includes a portion which extends in a projecting manner between the first connecting portion and the second connecting portion, and wherein the adjacent member includes a projecting portion which projects toward the bridging portion and is positioned between the first raised portion and the second raised portion.

4. An energy storage apparatus, comprising:
a plurality of energy storage devices which respectively have an external terminal and are arranged in a row in a first direction;
an adjacent member disposed between the energy storage devices disposed adjacently to the adjacent member in the first direction, the adjacent member capable of being fixed to a support body which supports the plurality of energy storage devices and the adjacent member; and
a bus bar which is configured to make the external terminals of the energy storage devices disposed on both sides of the adjacent member among the plurality of energy storage devices conductive with each other,
wherein the bus bar includes:
a first connecting portion connected to one external terminal which is made conductive by the bus bar,
a second connecting portion connected to the other external terminal which is made conductive by the bus bar, and
a portion which extends in a projecting manner in a direction away from the adjacent member in a second direction orthogonal to the first direction,
wherein the portion which extends in the projecting manner includes:
a first raised portion extending in the second direction from the first connecting portion;
a second raised portion extending in the second direction from the second connecting portion; and
a bridging portion which extends in the first direction and connects the first raised portion and the second raised portion to each other,
wherein the bridging portion oppositely faces the adjacent member in a state where a distance is provided in the second direction between the bridging portion and the adjacent member, and
wherein at least a portion of the adjacent member is disposed between the first raised portion and the second raised portion, such that the portion of the adjacent member extends above a level of the first connecting portion and the second connecting portion.

5. The energy storage apparatus according to claim 1, wherein the oppositely facing member oppositely faces the plurality of energy storage devices in a third direction orthogonal to the first direction and the second direction.

6. The energy storage apparatus according to claim 1, wherein the oppositely facing member faces the plurality of energy storage devices in a side of the energy storage apparatus that is different from another side of the energy storage apparatus on which the external terminals are disposed.

7. The energy storage apparatus according to claim 1, wherein the oppositely facing member faces the plurality of energy storage devices in a side of the energy storage devices that is different from another side of the energy storage devices on which the external terminals are disposed.

8. The energy storage apparatus according to claim 1, wherein the bus bar includes the one portion which extends in the projecting manner.

9. The energy storage apparatus according to claim 1, wherein the one portion of the bus bar contacts the adjacent member.

10. The energy storage apparatus according to claim 1, wherein the one portion of the bus bar is in a direct contact with the adjacent member.

11. The energy storage apparatus according to claim 1, wherein a top surface of the adjacent member extends above a level of the first connecting portion and the second connecting portion.

12. The energy storage apparatus according to claim 4, wherein the portion of the bus bar is in a direct contact with the portion of the adjacent member.

13. The energy storage apparatus according to claim 4, wherein, in the first direction, the portion of the adjacent member is disposed between the first connecting portion and the second connecting portion.

\* \* \* \* \*